United States Patent
Jia et al.

(10) Patent No.: US 12,108,302 B2
(45) Date of Patent: Oct. 1, 2024

(54) METHOD AND SYSTEM FOR NETWORK SLICE-BASED HIGH PRIORITY SERVICE HANDLING IN RADIO ACCESS TECHNOLOGY (RAT) SWITCHING

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 66 days.

(21) Appl. No.: 17/361,640

(22) Filed: Jun. 29, 2021

(65) Prior Publication Data
US 2022/0417823 A1    Dec. 29, 2022

(51) Int. Cl.
H04W 24/08    (2009.01)
H04W 36/38    (2009.01)

(52) U.S. Cl.
CPC ......... *H04W 36/385* (2013.01); *H04W 24/08* (2013.01)

(58) Field of Classification Search
CPC ............... H04W 36/385; H04W 24/08; H04W 36/0022; H04W 36/14; H04W 36/144
See application file for complete search history.

(56) References Cited

U.S. PATENT DOCUMENTS

| 8,700,081 B2 * | 4/2014 | Lindner | H04W 76/45 370/395.42 |
| 8,718,726 B2 * | 5/2014 | Shukla | H04L 47/805 455/575.5 |
| 9,107,183 B2 * | 8/2015 | Anchan | H04W 48/08 |
| 9,408,113 B2 * | 8/2016 | Keller | H04W 36/14 |

(Continued)

FOREIGN PATENT DOCUMENTS

| CN | 112367690 B * | 3/2023 | ............ H04W 28/26 |
| WO | WO-2005008979 A2 * | 1/2005 | ............ H04W 68/02 |

(Continued)

OTHER PUBLICATIONS

3GPP TS 23.216 V11.1.0 (Jun. 2011) (Year: 2011).*

*Primary Examiner* — Yuwen Pan
*Assistant Examiner* — Swati Jain
(74) *Attorney, Agent, or Firm* — Guntin & Gust, PLC; Atanu Das

(57) ABSTRACT

Aspects of the subject disclosure may include, for example, detecting initiation of a service associated with a UE, where the service comprises an OTT voice/video call, facilitating, for the service, activation of an end-to-end network slice between a core network and the UE, detecting a RAT switch determination for the UE, where the RAT switch determination relates to communicative coupling of the UE with a second network node, and where the second network node is associated with a second RAT different from the first RAT, responsive to the detecting the RAT switch determination, (Continued)

determining whether the service is ongoing over the end-to-end network slice, and, based on a determination that the service is ongoing over the end-to-end network slice, preventing the UE from communicatively coupling with the second network node until the service is determined to be completed or until the end-to-end network slice is released. Other embodiments are disclosed.

20 Claims, 8 Drawing Sheets

(56) References Cited

U.S. PATENT DOCUMENTS

| | | | | |
|---|---|---|---|---|
| 11,470,514 B2* | 10/2022 | Mallikarjunan | | H04W 36/14 |
| 11,523,310 B2* | 12/2022 | Zhu | | H04W 36/14 |
| 11,671,887 B2* | 6/2023 | Chin | | H04W 36/08 |
| | | | | 370/331 |
| 11,696,189 B2* | 7/2023 | Xu | | H04W 36/0058 |
| | | | | 455/428 |
| 11,838,939 B2* | 12/2023 | Chande | | H04J 11/005 |
| 11,864,026 B2* | 1/2024 | Patil | | H04W 48/02 |
| 2010/0172301 A1* | 7/2010 | Watfa | | H04W 4/00 |
| | | | | 370/328 |
| 2010/0246535 A1* | 9/2010 | Lindner | | H04W 36/385 |
| | | | | 370/332 |
| 2011/0319073 A1* | 12/2011 | Ekici | | H04W 48/18 |
| | | | | 455/553.1 |
| 2012/0315907 A1* | 12/2012 | Chin | | H04W 76/50 |
| | | | | 455/436 |
| 2013/0195076 A1* | 8/2013 | Keller | | H04W 4/90 |
| | | | | 370/331 |
| 2014/0071889 A1* | 3/2014 | Aksu | | H04L 65/1059 |
| | | | | 370/328 |
| 2014/0155065 A1* | 6/2014 | Centonza | | H04W 36/245 |
| | | | | 455/436 |
| 2014/0355565 A1* | 12/2014 | Hayes | | H04W 36/245 |
| | | | | 370/331 |
| 2015/0257044 A1* | 9/2015 | Jiang | | H04W 8/065 |
| | | | | 455/433 |
| 2015/0289153 A1* | 10/2015 | Gopal | | H04W 24/08 |
| | | | | 455/436 |
| 2015/0312843 A1* | 10/2015 | Anchan | | H04W 48/02 |
| | | | | 455/434 |
| 2015/0365850 A1* | 12/2015 | Mutikainen | | H04W 76/25 |
| | | | | 370/331 |
| 2016/0080951 A1* | 3/2016 | Lindoff | | H04W 24/04 |
| | | | | 455/418 |
| 2016/0142945 A1* | 5/2016 | Keller | | H04W 36/14 |
| | | | | 370/331 |
| 2016/0286449 A1* | 9/2016 | Choi | | H04W 36/04 |
| 2016/0353316 A1* | 12/2016 | Boettger | | H04W 36/0022 |
| 2016/0381616 A1* | 12/2016 | Pani | | H04W 36/30 |
| | | | | 370/332 |
| 2017/0026865 A1* | 1/2017 | Behravan | | H04W 24/02 |
| 2017/0142591 A1* | 5/2017 | Vrzic | | H04W 24/02 |
| 2019/0110236 A1* | 4/2019 | Huang | | H04W 36/0027 |
| 2019/0274082 A1* | 9/2019 | Vemuri | | H04W 48/04 |
| 2019/0357129 A1* | 11/2019 | Park | | H04W 60/04 |
| 2019/0364495 A1* | 11/2019 | Mildh | | H04W 48/18 |
| 2020/0008134 A1* | 1/2020 | Wallentin | | H04W 72/30 |
| 2020/0015128 A1* | 1/2020 | Stojanovski | | H04W 76/50 |
| 2020/0068430 A1* | 2/2020 | Chan | | H04L 47/11 |
| 2020/0077327 A1* | 3/2020 | Duan | | H04W 76/11 |
| 2020/0077356 A1* | 3/2020 | Youn | | H04W 68/02 |
| 2020/0120487 A1* | 4/2020 | Tang | | H04M 15/66 |
| 2020/0169934 A1* | 5/2020 | Sundararajan | | H04W 36/0069 |
| 2020/0169989 A1* | 5/2020 | Zhu | | H04W 72/02 |
| 2020/0178196 A1* | 6/2020 | Wang | | H04W 60/005 |
| 2020/0245195 A1* | 7/2020 | Zhu | | H04W 36/08 |
| 2020/0413297 A1* | 12/2020 | Chiang | | H04W 76/18 |
| 2021/0007026 A1* | 1/2021 | Kho | | H04W 36/12 |
| 2021/0036920 A1* | 2/2021 | Erman | | H04L 41/0894 |
| 2021/0099390 A1* | 4/2021 | Thanneeru | | H04W 8/18 |
| 2021/0136653 A1* | 5/2021 | Zhang | | H04W 40/02 |
| 2021/0185567 A1* | 6/2021 | Zhang | | H04W 8/08 |
| 2021/0298042 A1* | 9/2021 | Siraj | | H04L 47/24 |
| 2021/0306939 A1* | 9/2021 | Zhang | | H04L 12/465 |
| 2021/0399956 A1* | 12/2021 | Bogineni | | H04L 41/5003 |
| 2022/0022102 A1* | 1/2022 | Talat | | H04W 80/10 |
| 2022/0022108 A1* | 1/2022 | Mouquet | | H04W 28/082 |
| 2022/0078871 A1* | 3/2022 | Won | | H04W 76/19 |
| 2022/0086712 A1* | 3/2022 | Teyeb | | H04W 36/0058 |
| 2022/0095184 A1* | 3/2022 | Patil | | H04W 36/305 |
| 2022/0124588 A1* | 4/2022 | Zhu | | H04W 76/16 |
| 2022/0141719 A1* | 5/2022 | Shan | | H04W 36/26 |
| | | | | 370/331 |
| 2022/0150769 A1* | 5/2022 | Vivanco | | H04W 36/0022 |
| 2022/0286839 A1* | 9/2022 | Zhao | | H04W 76/16 |
| 2022/0312277 A1* | 9/2022 | Akdeniz | | H04W 72/569 |
| 2022/0322185 A1* | 10/2022 | Patil | | H04W 36/305 |
| 2023/0007623 A1* | 1/2023 | Da Silva | | H04W 24/08 |
| 2023/0092324 A1* | 3/2023 | Seidel | | H04W 48/18 |
| | | | | 370/329 |
| 2023/0144777 A1* | 5/2023 | Rahat | | H04W 36/0058 |
| | | | | 370/331 |
| 2023/0276309 A1* | 8/2023 | Xu | | H04B 7/18541 |
| | | | | 455/428 |
| 2023/0336424 A1* | 10/2023 | Wang | | H04L 45/64 |
| 2023/0413114 A1* | 12/2023 | Ly | | H04W 28/0215 |

FOREIGN PATENT DOCUMENTS

| | | | | | |
|---|---|---|---|---|---|
| WO | WO-2013029639 A1 | * | 3/2013 | | H04L 65/1083 |
| WO | WO-2018231027 A1 | * | 12/2018 | | H04W 12/06 |
| WO | WO-2021055368 A1 | * | 3/2021 | | H04B 7/15 |
| WO | WO-2021168257 A1 | * | 8/2021 | | |
| WO | WO-2021209976 A1 | * | 10/2021 | | H04W 48/18 |
| WO | WO-2021252631 A1 | * | 12/2021 | | |
| WO | WO-2022034554 A1 | * | 2/2022 | | |
| WO | WO-2022082011 A1 | * | 4/2022 | | |

* cited by examiner

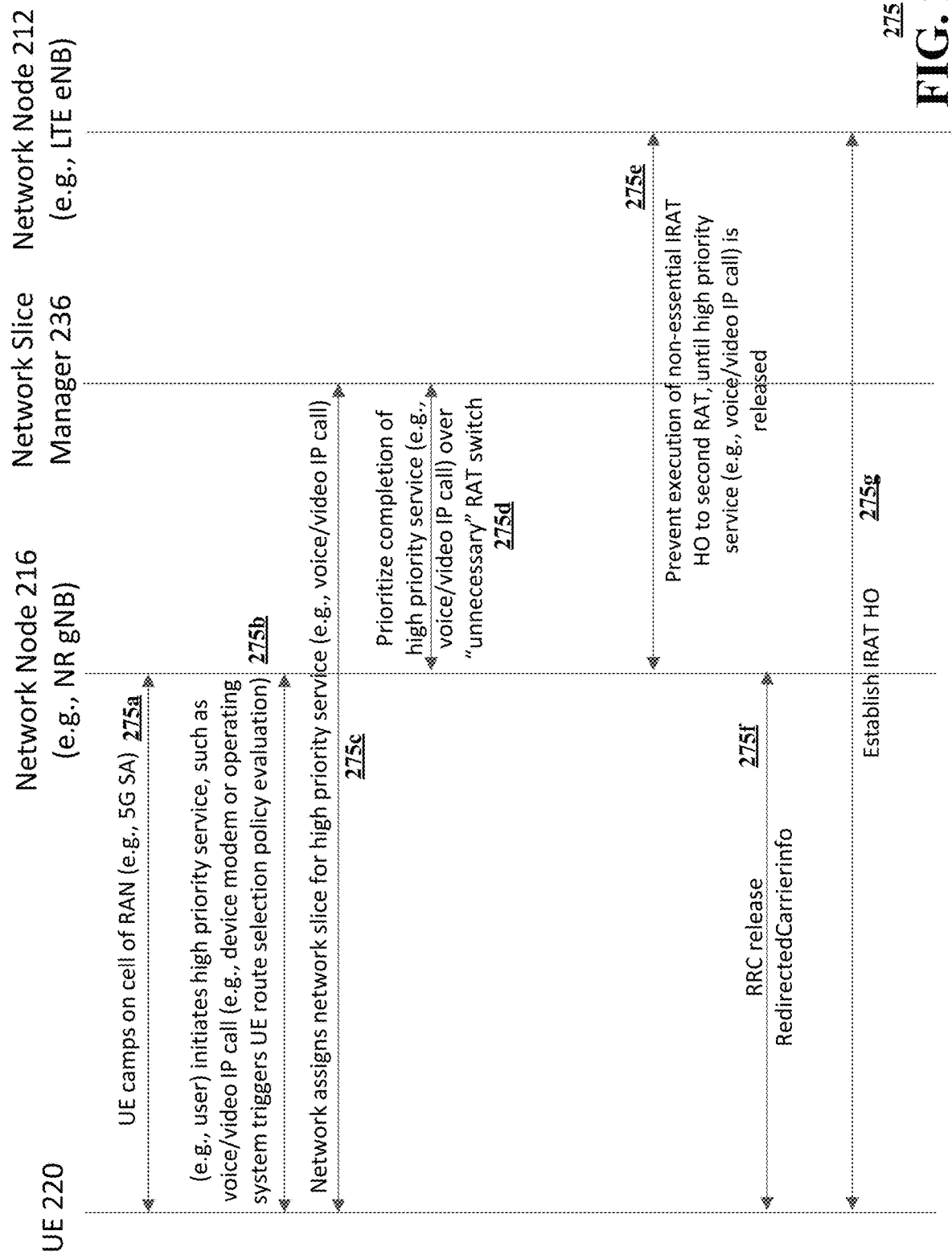

METHOD AND SYSTEM FOR NETWORK SLICE-BASED HIGH PRIORITY SERVICE HANDLING IN RADIO ACCESS TECHNOLOGY (RAT) SWITCHING

FIELD OF THE DISCLOSURE

The subject disclosure relates to network slice-based high priority application or service handling in radio access technology (RAT) switching.

BACKGROUND

In recent years, mobile network operators have developed and deployed 5G Non-Standalone (NSA) architectures (i.e., Evolved Universal Terrestrial Radio Access (E-UTRA)-New Radio (NR) Dual Connectivity (EN-DC) configurations), where 5G radio access networks (RANs) and associated New Radio (NR) interfaces are used in conjunction with existing 4G/Long Term Evolution (LTE) and Evolved Packet Core (EPC) systems. Leveraging a legacy 4G/LTE infrastructure enables NR technology to be used without replacing existing network installations and provides increased network capacity and capabilities (e.g., higher data rates and lower latencies).

BRIEF DESCRIPTION OF THE DRAWINGS

Reference will now be made to the accompanying drawings, which are not necessarily drawn to scale, and wherein:

FIG. 2C depicts an illustrative embodiment of a data flow in accordance with various aspects described herein.

DETAILED DESCRIPTION

Figure 1:
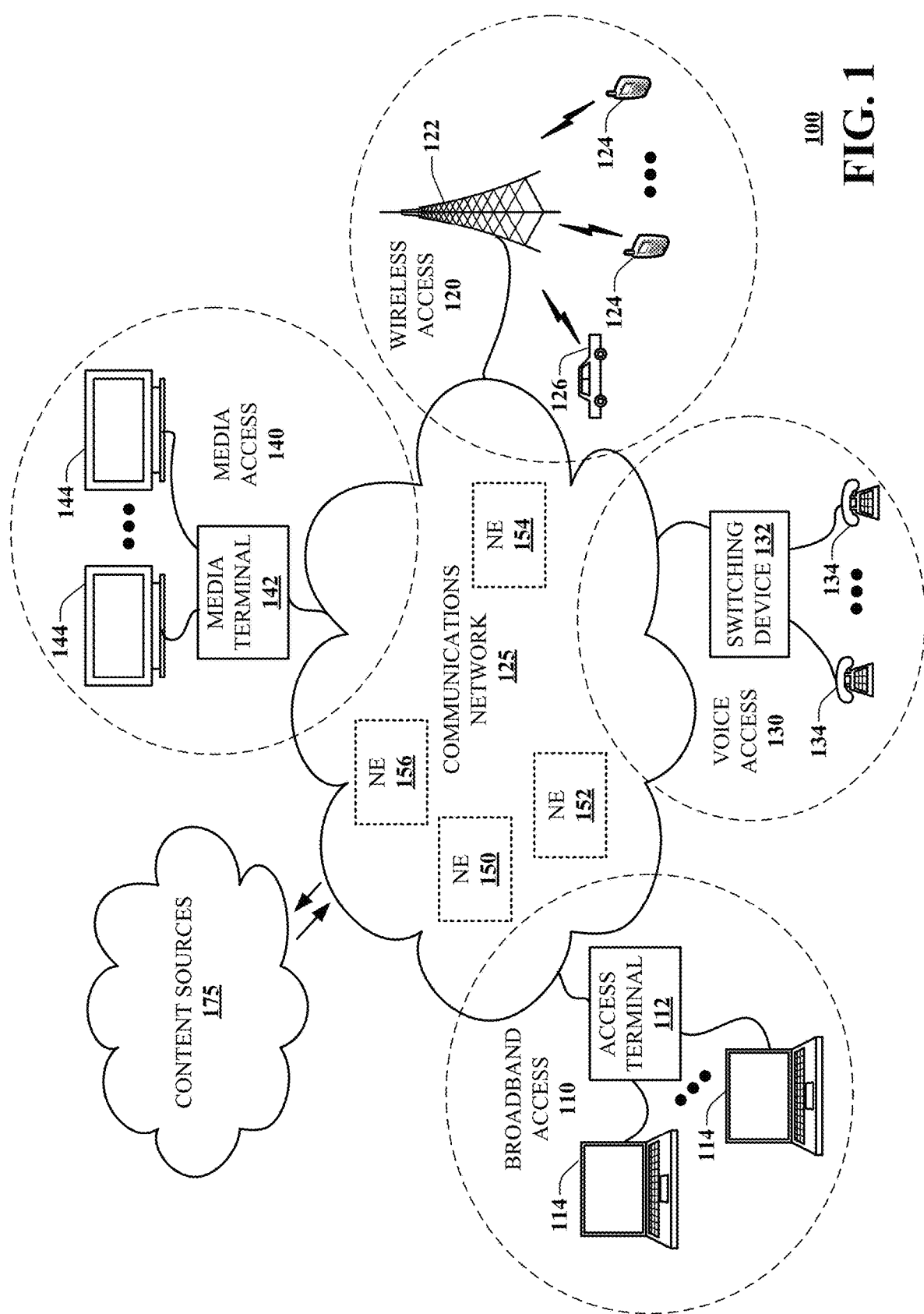
FIG. 1 is a block diagram illustrating an exemplary, non-limiting embodiment of a communications network in accordance with various aspects described herein.

Recently, network operators have begun building out 5G Standalone (SA) networks with cloud-native 5G Next Generation Cores (NGCs) to unlock the full set of offerings of 5G mobile technology—i.e., support for advanced network slicing functions and new services (e.g., massive Internet-of-Things (IoTs), smart factories, autonomous vehicles, and so on). While 5G SA offers numerous benefits, there are challenges to rolling out and implementing a 5G SA network infrastructure. Achieving full 5G coverage requires significant planning and building out of multiple cell sites, which can be costly and time-consuming. Additionally, even with a 5G SA infrastructure, there may still be a need to rely on the 4G/LTE infrastructure of a 5G NSA (or EN-DC) configuration to balance (or provide suitable) network coverage and speed for certain services, such as voice services. For example, in a case where a 5G RAN determines, based on signal strength levels, network throughput/speed levels, etc., that a user equipment (UE) is to fall back from a 5G SA mode to a 5G NSA mode, the 5G SA network may effect switching between 5G SA and 4G/LTE. However, such switching, whether performed via an inter-Radio Access Technology (IRAT) handover (HO) or a release and redirect procedure, can introduce noticeable delays and thus service interruptions, which can negatively impact user experience, particularly for delay-sensitive, high priority applications or services, such as Over-the-Top (OTT) voice/video apps or services (e.g., voice-over-Internet Protocol (VOIP), video over IP, or the like).

The subject disclosure describes, among other things, illustrative embodiments of a service handling platform (e.g., implemented in a network node of a RAN, such as a 5G SA gNodeB (gNB)) that is capable of prioritizing high priority, delay-sensitive applications or services (such as OTT voice/video apps or services) over RAT switching (or IRAT HOs). In exemplary embodiments, a dedicated, end-to-end network slice, having a unique network slice ID, may be configured or activated (e.g., by a network slice manager of a 5G Core (5GC) network) for a high priority application or service initiated for a UE. Traffic corresponding to the high priority application or service may be associated with (e.g., assigned) the network slice ID, which enables the service handling platform (or the network node—e.g., the 5G SA gNB) to distinguish such traffic from other traffic for optimization purposes.

In various embodiments, the service handling platform may be configured to distinguish between conditions or circumstances where there is a need to perform a RAT switch and where there is no need to perform a RAT switch (or where a RAT switch is not essential or not critical). In certain embodiments, the service handling platform may distinguish between such conditions based on measurement data (e.g., inter-frequency measurements, such as signal strength-related data, network throughput/speed-related data, or the like) relating to network nodes (e.g., the 5G SA gNB and a different network node of a different RAN, such as an eNodeB (eNB) of a 5G NSA network) and based on whether a high priority application or service is being facilitated for the UE. Where the service handling platform identifies that a high priority application or service is being facilitated for the UE and determines, based on measurement data, that a RAT switch is not essential (or not warranted) given the ongoing high priority application or service, the service handling platform may prevent IRAT switching for the UE until it is determined that the high priority application or service has been completed or released.

Embodiments described herein provide for bundling of high priority, delay-sensitive (or interruption-sensitive) applications or services (which may not be associated with conventional quality of service-related identifiers) with dedicated, end-to-end network slices (i.e., using network slicing as an end-to-end index), which allows for differentiation of such applications or services, and therefore optimizations therefor. Preventing interruption of high priority applications or services, by de-prioritizing or avoiding IRAT HOs in situations where a RAT switch is determined to be not essential or not critical, also reduces or eliminates redials and additional signaling that may otherwise be needed for such IRAT HOs, which conserves network resources and improves network performance, resource utilization, as well as overall user experience.

One or more aspects of the subject disclosure include a first network node, comprising a processing system including a processor, and a memory that stores executable instructions that, when executed by the processing system, facilitate performance of operations, wherein the first network node is associated with a first radio access technology (RAT). The operations can include detecting initiation of a service associated with a user equipment (UE), wherein the service comprises an Over-the-Top (OTT) voice call or an OTT video call. Further, the operations can include facilitating, for the service, activation of an end-to-end network slice between a core network and the UE, and detecting a RAT switch determination for the UE, wherein the RAT switch determination relates to communicative coupling of the UE with a second network node, and wherein the second network node is associated with a second RAT different from the first RAT. Further, the operations can include, responsive to the detecting the RAT switch determination, determining whether the service is ongoing over the end-to-end network slice. Further, the operations can include, based on a determination that the service is ongoing over the end-to-end network slice, preventing the UE from communicatively coupling with the second network node until the service is determined to be completed or until the end-to-end network slice is released.

One or more aspects of the subject disclosure include a non-transitory machine-readable medium, comprising executable instructions that, when executed by a processing system of a first network node including a processor, facilitate performance of operations. The operations can include, during facilitation of a delay-sensitive application or service for a user equipment (UE) over a dedicated, end-to-end network slice, obtaining measurement data relating to the first network node, wherein the first network node relates to a first radio access technology (RAT). Further, the operations can include identifying, based on the measurement data, that a signal strength associated with the first network node satisfies a first threshold but not a second threshold that is lower than the first threshold. Further, the operations can include responsive to the identifying, determining whether the delay-sensitive application or service is being facilitated for the UE over the dedicated, end-to-end network slice, and, based upon a first determination that the delay-sensitive application or service is being facilitated for the UE over the dedicated, end-to-end network slice, preventing a second network node, that is associated with a second RAT, from establishing an inter-RAT (IRAT) handover (HO) for the UE. Further, the operations can include, based upon a second determination that the delay-sensitive application or service is no longer being facilitated for the UE over the dedicated, end-to-end network slice, permitting the second network node to establish the IRAT HO for the UE.

One or more aspects of the subject disclosure include a method. The method can comprise detecting, by a processing system associated with a network slice manager and including a processor, an initiation of an application or service for a user equipment (UE), wherein the application or service comprises an OTT voice call or an OTT video call, wherein the UE is communicatively coupled to a first network node, and wherein the first network node relates to a first radio access technology (RAT). Further, the method can include configuring, by the processing system, an end-to-end network slice for the application or service, wherein the end-to-end network slice facilitates delivery of the application or service between a core network and the UE, and wherein facilitation of the delivery of the application or service over the end-to-end network slice enables the first network node to prioritize the application or service over a RAT switch by preventing a second network node, that is associated with a second RAT, from performing the RAT switch if the delivery of the application or service is ongoing over the end-to-end network slice.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, prioritizing of high priority, delay-sensitive (or interruption-sensitive) applications or services over RAT switching (or IRAT HOs). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
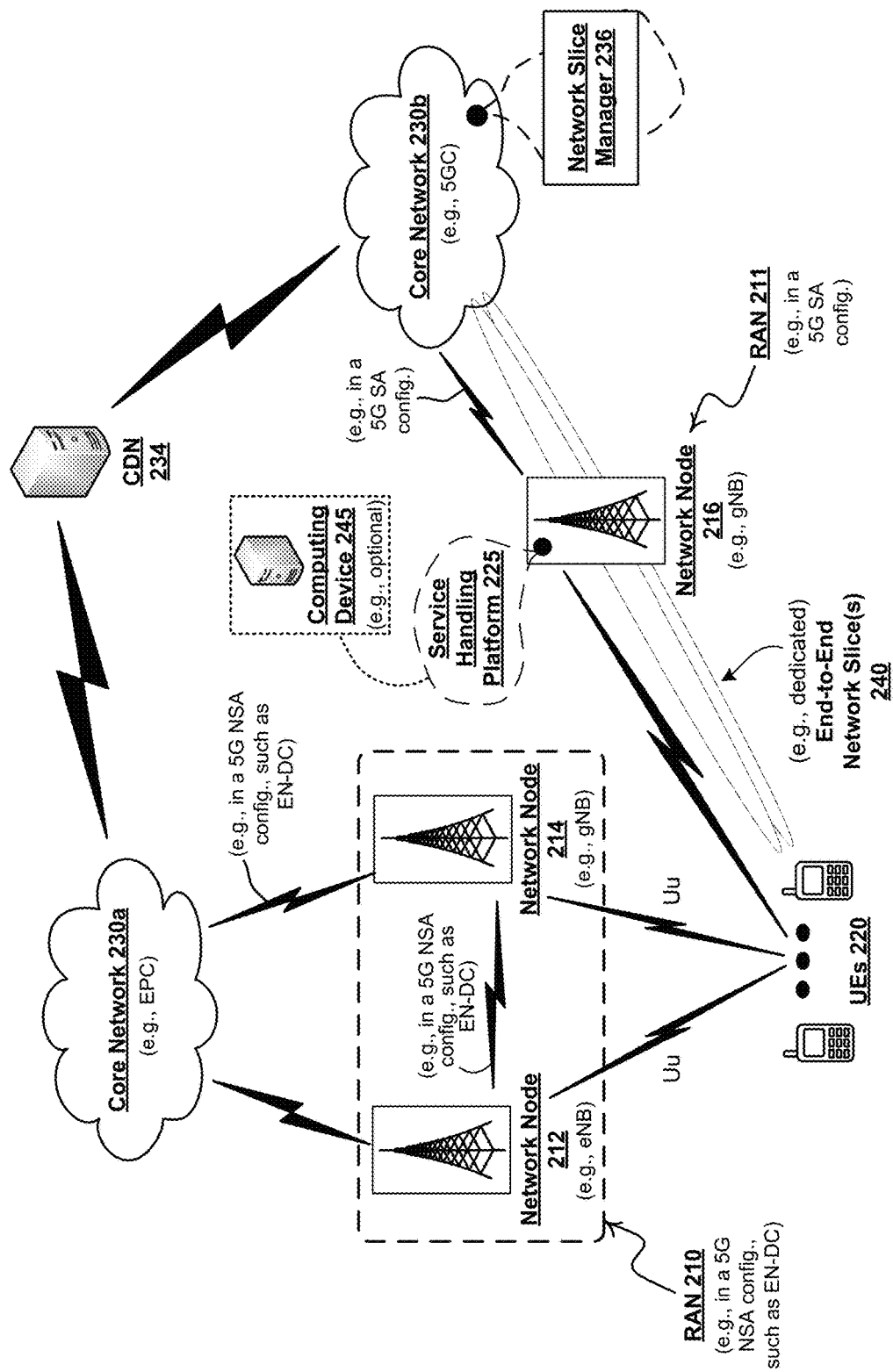
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system or communications network 200 functioning within, or overlaid upon, the communications network 100 of FIG. 1 in accordance with various aspects described herein. Communications network 200 can include a RAN 210 that includes one or more network nodes (e.g., access points, such as base stations or the like). As depicted in FIG. 2A, the RAN 210 can include a network node 212 and a network node 214. In various embodiments, the network node 212 and the network node 214 can employ different RATs. For example, the network node 212 may be an eNB or the like that employs 4G/LTE technology, and the network node 214 may be a gNB or the like that employs 5G NR technology. In certain embodiments, the network nodes 212 and 214 may be co-located or may reside in a common structure (e.g., the same chassis or the like) or may be implemented or reside in separate devices.

In various embodiments, each of network node 212 and the network node 214 can include a radio resource control (RRC) entity capable of exchanging network traffic (e.g., protocol data units (PDUs)) with various UEs 220. A UE 220 can be equipped with transmitter (Tx) device(s) and/or receiver (Rx) device(s) configured to communicate with, and utilize network resources provided via, the network node 212 and/or the network node 214.

One or more of the network nodes 212, 214 of the RAN 210 can be in communication with one or more mobility core network(s) via one or more backhaul network(s). In certain embodiments, the RAN 210 can be configured to provide dual connectivity according to an Evolved Universal Terrestrial Radio Access (E-UTRA)-New Radio (NR) Dual Connectivity (EN-DC) configuration. In such embodiments, the EN-DC configuration can provide a 5G NSA implementation. For example (related to a 5G NSA implementation), an eNB (e.g., the network node 212) and an evolved packet core (EPC) (e.g., a core network 230a) can be utilized as an anchor for mobility management and coverage for an additional 5G (or NR) carrier. Network traffic can be split in a variety of manners, such as across LTE and NR at the eNB, at the core network 230a, and/or at an NR cell (e.g., associated with the network node 214).

As shown in FIG. 2A, the communications network 200 can also include a RAN 211 that includes a network node 216 communicatively coupled (e.g., via one or more backhaul network(s)) with a core network 230b (e.g., a 5G Core (5GC) network). Similar to the network nodes 212 and 214, the network node 216 can include an RRC entity capable of exchanging network traffic (e.g., PDUs) with various UEs 220 and providing network resources to the UEs 220. In exemplary embodiments, the network node 216 may be a gNB or the like that employs 5G NR technology in a 5G SA implementation. In certain embodiments, a network node may be configured for use in multiple network configurations—for example, the network node 214 and the network node 216 may be the same network node (e.g., a gNB), and may be configured to operate in both 5G NSA and 5G SA modes.

It is to be appreciated and understood that the communications network 200 can include any number/type of network configurations or network nodes and/or various types of heterogeneous cell configurations with various quantities of cells and/or types of cells.

A core network, such as one or more of the core networks 230a and 230b, can be in further communication with one or more other networks (e.g., one or more content delivery networks (CDNs) (one of which, CDN 234, is shown)), one or more services, and/or one or more devices. One or more of the core networks 230a and 230b can include various network devices and/or systems that provide a variety of functions. Examples of functions facilitated or provided by a core network can include an access mobility and management function (AMF) configured to facilitate mobility management in a control plane of the communications network 200; a User Plane Function (UPF) configured to provide access to a data network, such as a packet data network (PDN), in a user (or data) plane of the communications network 200; a Unified Data Management (UDM) function; a Session Management Function (SMF); a Policy Control Function (PCF); and/or the like. In various embodiments, a core network may include one or more devices implementing other functions, such as a master user database server device for network access management, a PDN gateway server device for facilitating access to a PDN, and/or the like.

As shown in FIG. 2A, the core network 230b (e.g., 5GC) may include a network slice manager 236. In various embodiments, the network slice manager 236 may be capable of configuring, and prioritizing, network slices (e.g., for different UEs). A network slice is an independent, virtualized instance defined by allocation of a subset of available network resources, and may be tailored to meet specific requirement(s) of one or more applications and/or services. In some embodiments, some or all of the functionalities of the network slice manager 236 may be implemented in a software-defined network (SDN). In alternate embodiments, some or all of the functionalities of the network slice manager 236 may be implemented in one or more other devices or components of the core network 230b.

In exemplary embodiments, the network slice manager 236 may be capable of instantiating one or more dedicated, end-to-end network slices 240 for (e.g., delay-sensitive) high priority applications or services between one or more UEs 220 and the core network 230b. Delay-sensitive, high priority applications or services can include, for example, OTT voice/video apps or services, such as VOIP, video over IP, or the like (including, for example, VOIP or video over IP services that are incorporated into, or bundled within, an application). In certain embodiments, OTT video/audio streaming may also be treated as a high priority application or service. In exemplary embodiments, the network slice manager 236 may be configured to establish a respective dedicated, end-to-end network slice 240 for a given high priority application or service between a UE 220 and the core network 230b. As one example, the network slice manager 236 may configure a first network slice, having a first network slice ID, for a video chat or video telephony application, a second network slice, having a second network slice ID, for a Wi-Fi calling service, a third network slice, having a third network slice ID, for a web-based teleconference/virtual meeting application, and so on. In this example, traffic corresponding to the video chat or video telephony application may be associated with the first network slice ID, traffic corresponding to the Wi-Fi calling service may be associated with the second network slice ID, traffic corresponding to the web-based teleconference/virtual meeting application may be associated with the third network slice ID, etc. It is to be appreciated that numerous network slices, having respective network slice IDs, may be configured for various applications or services.

As depicted in FIG. 2A, the network node 216 may include, or may be associated with, a service handling platform 225. In various embodiments, the service handling platform 225 may be configured to determine whether there is a need to perform a RAT switch (e.g., whether a RAT switch is essential/critical or not) based on measurement data (e.g., inter-frequency measurements, such as signal strength-related data, network throughput/speed-related data, or the like) relating to network nodes (e.g., the network nodes 212, 214, and/or 216) and/or based on a status of a high priority application or service associated with the UE 220, and may be configured to control IRAT HOs accordingly, as described in more detail below with respect to FIGS. 2B and 2C.

As shown in FIG. 2A, the communications network 200 can (e.g., optionally) include a computing device 245. The computing device 245 can include one or more devices, such as server device(s), configured to provide one or more functions or capabilities relating to prioritizing delay-sensitive, high priority applications or services for UEs. In various embodiments, the service handling platform 225 may be implemented in the computing device 245. In some embodiments, the computing device 245 can additionally, or alternatively, provide edge computing functions and/or capabilities, provisioning of data and/or services for user equipment (e.g., such as UEs 220), data analytics function(s), machine learning and/or artificial intelligence function(s) that provide resource management capabilities (e.g., mobility management, admission control, interference management, etc.), automatic planning functions, configuration functions, optimization functions, diagnostic functions, healing functions, and/or the like. For example, in some implementations, the computing device 245 can include, or be implemented in, a multi-access edge computing (MEC) device or device(s), a RAN Intelligent Controller (MC), a Self-Organizing Network (SON), and/or the like.

It is to be appreciated and understood that, while embodiments of the service handling platform 225 are described herein as relating to certain RATs, such as 4G/LTE and 5G NR technologies, various embodiments of the service handling platform 225 may be applied for other RATs.

It is also to be appreciated and understood that the quantity and arrangement of network nodes, devices, platforms, user equipment, managers, network slices, and networks shown in FIG. 2A are provided as an example. In practice, there may be additional network nodes, devices, platforms, user equipment, managers, network slices, and/or networks, different network nodes, devices, platforms, user equipment, managers, network slices, and/or networks than those shown in FIG. 2A. For example, the communications network 200 can include more or fewer network nodes, devices, platforms, user equipment, managers, network slices, and/or networks. Furthermore, two or more network nodes, devices, platforms, user equipment, managers, network slices, and/or networks shown in FIG. 2A may be implemented within a single network node, device, platform, user equipment, manager, network slice, or network shown in FIG. 2A or a single network node, device, platform, user equipment, manager, network slice, or network shown in FIG. 2A may be implemented as multiple, distributed network nodes, devices, platforms, user equipment, managers, network slices, or networks. Additionally, or alternatively, a set of network nodes, devices, platforms, user equipment, managers, network slices, and/or networks (e.g., one or more network nodes, devices, platforms, user equipment, managers, network slices, and/or networks) of the communications network 200 may perform one or more functions described as being performed by another set of network nodes, devices, platforms, user equipment, managers, network slices, and/or networks of the communications network 200.

RATs generally employ service quality-related mechanisms to ensure that different types of bearer traffic are allocated appropriate network resources. For example, 4G/LTE networks perform priority scheduling of bearer traffic based on service quality levels/priorities/types—i.e., Quality-of-Service (QoS) Class Identifiers (QCIs), where different bearer traffic that require different qualities of service are associated with different QCI values. 3rd Generation Partnership Project (3GPP) standards define QCIs 1 through 9 that each has a different priority and is associated with a particular type of service and corresponding delay budgeting, packet error loss rate, latency, transmission speed, transmission frequency, and/or the like. As an example, 3GPP standards define QCI 1 for conversational voice (voice over LTE (VoLTE)), where a dedicated bearer with QCI 1 may be established for an initiated voice call. By assigning the voice call to QCI 1, a RAN would identify traffic associated with the voice call and allocate network resources accordingly. 5G NR networks similarly perform priority scheduling of bearer traffic based on QoS priorities/levels/types—i.e., 5G QoS Identifiers (5 QIs). 3GPP standards provide a mapping from 5QI to QoS characteristics, where there is generally a one-to-one, corresponding mapping to QCIs of 4G/LTE (e.g., QCIs 1 through 9).

Implementing network slicing with end-to-end indexing (e.g., via network slice IDs) enables applications and services, such as delay-sensitive, high priority applications or services (e.g., OTT voice/video apps or services, such as VOIP, video over IP, or the like), which may not be associated with 3GPP-based QoS identifiers, to be treated (e.g., to be processed, allocated with network resources, etc.) by a RAN in a manner similar to how the RAN might treat applications or services that are associated with QoS identifiers. As described in more detail below, association of application/service traffic with, and identification of such traffic based on, network slice IDs enables traffic prioritization as well as certain service-related optimizations.

Figure 2B:
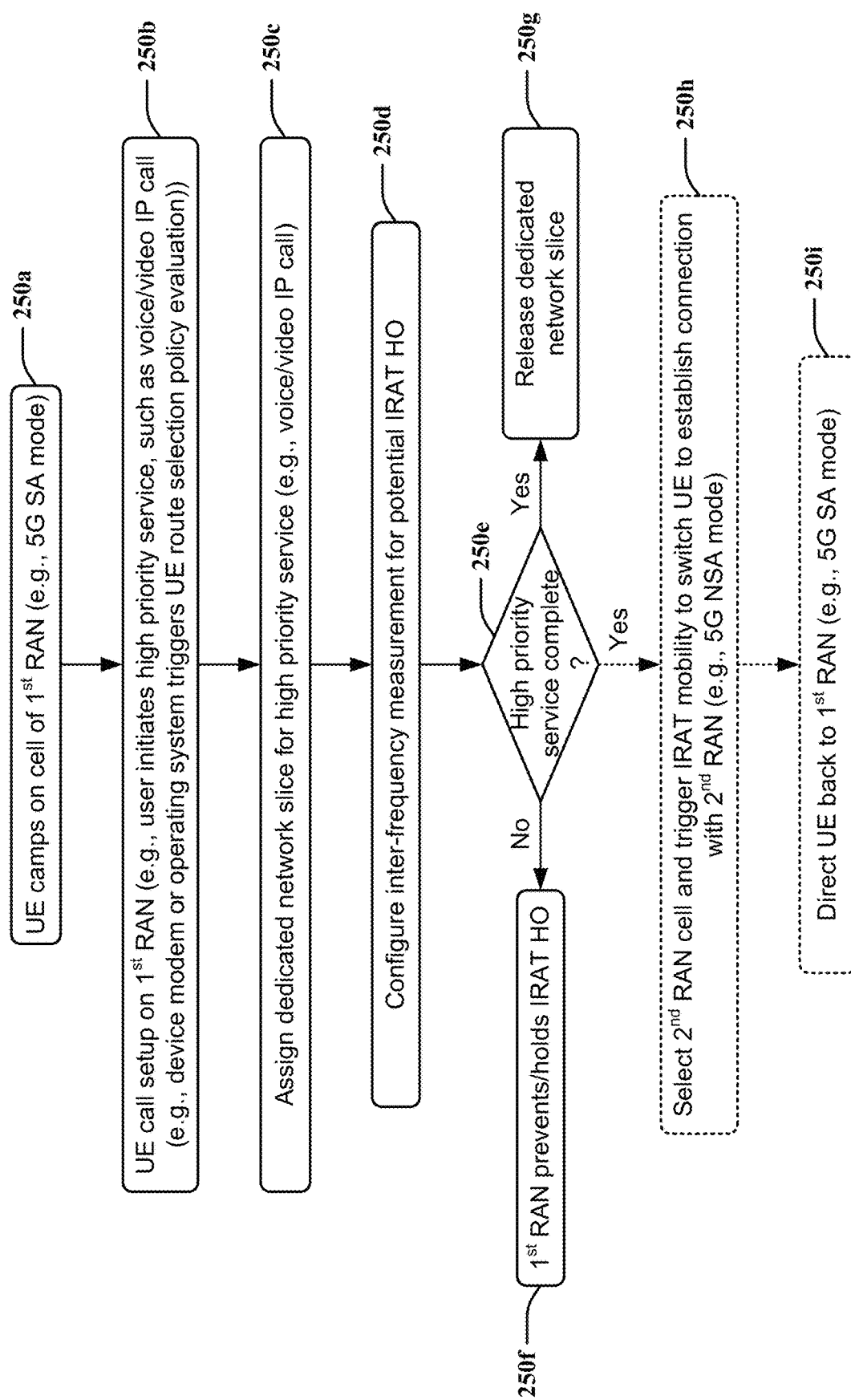
FIG. 2B depicts an illustrative embodiment of a method in accordance with various aspects described herein.

FIG. 2B depicts an illustrative embodiment of a method 250 in accordance with various aspects described herein. At 250a, a UE may "camp" on a cell associated with a first RAN. For example, a UE 220 may (e.g., based upon cell searching or the like), select and establish (e.g., in a 5G SA mode) a connection with the network node 216 of the RAN 211.

At 250*b*, a call may be initiated or set up for the UE via the first RAN. For example, a user of the UE 220 may initiate, or the UE 220 may receive an external request to initiate, a (e.g., delay-sensitive) high priority application or service, such as an IP-based voice or video call. Initiation of such an application or service may, for example, involve a device modem or operating system triggering a UE route selection policy evaluation.

At 250*c*, the first RAN may facilitate configuration of a dedicated, end-to-end network slice for the high priority application or service. In various embodiments, a network slice manager, such as the network slice manager 236 of the core network 230*b*, may, based upon detecting initiation of the high priority application or service, define, configure, or otherwise activate, a dedicated, end-to-end network slice 240, having a unique network slice ID, for the high priority application or service. The network node 216 may, for example, facilitate the high priority application or service, between the UE 220 and the core network 230*b*, using the dedicated, end-to-end network slice 240. Traffic corresponding to the high priority application or service may be associated with (e.g., assigned) the network slice ID, which enables the network node 216 (and/or the service handling platform 225) to distinguish such traffic from other traffic for optimization purposes.

At 250*d*, inter-frequency measurements may be made (e.g., in preparation) for a potential IRAT HO. For example, the UE 220 may provide, and/or the network node 216 (and/or the service handling platform 225) may obtain, measurement data (e.g., signal strength-related data, network throughput/speed-related data, or the like) relating to network nodes, such as the network nodes 212, 214, and/or 216. In exemplary embodiments, the network node 216 (and/or the service handling platform 225) may distinguish between conditions where there is a need to perform a RAT switch and where there is no need to perform a RAT switch (or where a RAT switch is not essential or not critical), based on the measurement data and/or based on whether a high priority application or service being facilitated for the UE 220 has been completed or not.

In some embodiments, certain changes in signal strength may trigger a network/UE to perform RAT switching. In particular, where signal strength (e.g., between a UE and a network node, such as the strength of a radio frequency (RF) signal associated with a 5G SA radio link) satisfies a certain threshold (e.g., falls below or becomes equal to the certain threshold or the like), the network node 216 (and/or the service handling platform 225) may (e.g., immediately or near immediately) determine a need to perform a RAT switch and proceed to effect such a switch. In exemplary embodiments, multiple signal strength thresholds (e.g., forming a range) may instead be defined and used by the network node 216 (and/or the service handling platform 225) as part of determining whether there is a need to perform a RAT switch (or whether a RAT switch is not essential or not critical).

In a case where data regarding a signal strength associated with the network node 216 indicates that the signal strength does not satisfy (e.g., is not less than or equal to) a first threshold (such as, for example, the above-described certain threshold) and does not satisfy (e.g., is not less than or equal to) a second (lower) threshold, the network node 216 (and/or the service handling platform 225) may not determine a need to perform a RAT switch (or may determine that there is no need to perform a RAT switch), given that the signal strength associated with the network node 216 is likely sufficient for facilitating delivery of high priority applications or services. In some embodiments, the network node 216 (and/or the service handling platform 225) may (e.g., optionally) determine (at 250*e*) whether the high priority application or service (e.g., an IP-based voice or video call or the like) being facilitated for the UE 220 via the dedicated, end-to-end network slice 240 has been completed. In one or more of such embodiments, regardless of whether the high priority application or service has been completed, the network node 216 (and/or the service handling platform 225) may nevertheless not determine a need to perform a RAT switch (or may determine that there is no need to perform a RAT switch), given that the signal strength is likely sufficient for facilitating delivery of high priority applications or services.

In a different case where data regarding the signal strength associated with the network node 216 indicates that the signal strength satisfies (e.g., is less than or equal to) the first threshold (such as, for example, the above-described certain threshold) but does not satisfy (e.g., is not less than or equal to) the second (lower) threshold, the network node 216 (and/or the service handling platform 225) may (e.g., preliminarily) determine that a RAT switch might not be needed (e.g., might not be essential or critical). In such a case, the network node 216 (and/or the service handling platform 225) may determine (at 250*e*) whether the high priority application or service (e.g., an IP-based voice or video call or the like) being facilitated for the UE 220 via the dedicated, end-to-end network slice 240 has been completed. Where the network node 216 (and/or the service handling platform 225) determines that the high priority application or service is ongoing, the network node 216 (and/or the service handling platform 225) may decide that the signal strength is still likely sufficient to permit the high priority application or service to continue, and thus prioritize the high priority application or service over the RAT switch (e.g., by deeming the RAT switch as being not essential or not critical). However, where the network node 216 (and/or the service handling platform 225) determines that the high priority application or service has been completed, the network node 216 (and/or the service handling platform 225) may, in some embodiments, permit the RAT switch to be effected for the UE 220, given that such a RAT switch would likely have no risk of interrupting a high priority application or service.

In yet another difference case where data regarding the signal strength associated with the network node 216 indicates that the signal strength satisfies (e.g., is less than or equal to) the second (lower) threshold, the network node 216 (and/or the service handling platform 225) may determine that there is a need to perform a RAT switch. In some embodiments, the network node 216 (and/or the service handling platform 225) may (e.g., optionally) determine (at 250*e*) whether the high priority application or service (e.g., an IP-based voice or video call or the like) being facilitated for the UE 220 via the dedicated, end-to-end network slice 240 has been completed. In one or more of such embodiments, regardless of whether the high priority application or service has been completed, the network node 216 (and/or the service handling platform 225) may nevertheless determine that there is a need to perform a RAT switch, given that the signal strength is likely insufficient for facilitating delivery of high priority applications or services.

In this way, the network node 216 (and/or the service handling platform 225) can determine, based on a status of a high priority application or service (e.g., an IP-based voice or video call or the like) for a UE, whether a signal strength-related trigger of a RAT switch constitutes a non-essential RAT switch condition or not, and control IRAT HOs accordingly. Traffic associated with a high priority application or service can thus be prioritized by checking whether the high priority application or service is still ongoing for a UE prior to scheduling or permitting an IRAT HO.

Additionally, or alternatively, in some embodiments, a threshold period of time may be associated with signal strength changes and used (e.g., by the network node 216 and/or the service handling platform 225) as part of determining whether there is a need to perform a RAT switch (or whether a RAT switch is not essential or not critical).

In a case where data regarding the signal strength associated with the network node 216 indicates that the signal strength satisfies (e.g., is less than or equal to) the above-described second (lower) threshold, but subsequently no longer satisfies (e.g., becomes greater than or otherwise retraces back above) the second (lower) threshold within a threshold period of time, the network node 216 (and/or the service handling platform 225) may not determine a need to perform a RAT switch (or may determine that there is no need to perform a RAT switch), given that the signal strength has improved to a level that is likely sufficient for facilitating delivery of high priority applications or services.

In a different case where data regarding the signal strength associated with the network node 216 indicates that the signal strength satisfies (e.g., is less than or equal to) the second (lower) threshold for longer than the threshold period of time, the network node 216 (and/or the service handling platform 225) may determine that there is a need to perform a RAT switch. In some embodiments, the network node 216 (and/or the service handling platform 225) may (e.g., optionally) determine (at 250e) whether the high priority application or service (e.g., an IP-based voice or video call or the like) being facilitated for the UE 220 via the dedicated, end-to-end network slice 240 has been completed. In one or more of such embodiments, regardless of whether the high priority application or service has been completed, the network node 216 (and/or the service handling platform 225) may nevertheless determine that there is a need to perform a RAT switch, given that the signal strength is likely insufficient/unstable for facilitating delivery of high priority applications or services.

In various embodiments, where data regarding the signal strength associated with the network node 216 indicates that the signal strength fluctuates between satisfying (e.g., being less than or equal to) and not satisfying (e.g., being greater than) the second (lower) threshold for more than a predetermined number of times within a predefined period (e.g., fluctuates between satisfying and not satisfying the second (lower) threshold for more than 5 times within a 10 second period, more than 8 times within a 3 second period, and/or the like), and where the network node 216 (and/or the service handling platform 225) determines that the high priority application or service is ongoing, the network node 216 (and/or the service handling platform 225) may determine that there is a need to perform a RAT switch, given that the signal strength is likely insufficient/unstable for continued service delivery.

Additionally, network-related throughput/speed(s) may fluctuate, where differences in such throughput/speed(s) between RATs may typically trigger RAT switching. For example, where the network throughput associated with a 4G/LTE network node becomes greater than the network throughput associated with a 5G SA network node (e.g., due to congestion in the 5G SA network), a RAT switch may typically be performed for one or more UEs. In exemplary embodiments, in a case where the network node 216 (and/or the service handling platform 225) determines that the high priority application or service is ongoing, the network node 216 (and/or the service handling platform 225) may instead prioritize the high priority application or service over mere network-related throughput/speed fluctuations or differences between RATs. For example, the network node 216 (and/or the service handling platform 225) may not determine that there is a need to perform a RAT switch (or may determine that there is no need to perform a RAT switch) despite such fluctuations or differences, such that the high priority application or service may continue uninterrupted via the network node 216.

It is to be appreciated and understood that the network node 216 (and/or the service handling platform 225) may be capable of determining whether the high priority application or service has been completed or not (250e), in any suitable manner. For example, the network node 216 (and/or the service handling platform 225) may determine whether the high priority application or service has been completed based upon monitoring of traffic associated with the dedicated, end-to-end network slice 240 (e.g., traffic bearing the network slice ID of the dedicated, end-to-end network slice 240), based upon determining whether the dedicated, end-to-end network slice 240 is still activated (e.g., in accordance with data provided by the network slice manager 236 regarding a status of the dedicated, end-to-end network slice 240), and/or the like.

At 250f, in a case where the network node 216 (and/or the service handling platform 225) determines (e.g., based on one or more of the various conditions/scenarios described above with respect to reference number 250e) that there is no need to perform a RAT switch or that such a RAT switch is not essential or not critical, the network node 216 (and/or the service handling platform 225) may prevent, or otherwise hold or defer, RAT switching such that the high priority application or service may continue uninterrupted. That is, for example, the network node 216 (and/or the service handling platform 225) may prevent the UE 220 from falling back to the network node 212 (e.g., the 5G NSA or EN-DC mode), thereby allowing the UE 220 to continue and complete the high priority application or service without being interrupted by an IRAT HO. In various embodiments, the network node 216 (and/or the service handling platform 225) may prevent, or otherwise hold or defer, the RAT switching until the high priority application or service has been completed and/or until the network node 216 (and/or the service handling platform 225) determines (e.g., based on one or more of the various conditions/scenarios described above with respect to reference number 250e) that RAT switching needs to be performed.

As shown at 250g, where the high priority application or service has been completed, the dedicated, end-to end network slice may be released or otherwise deactivated. For example, after the IP-based voice or video call is completed or terminated (e.g., by the user), the core network 230b may release or otherwise deactivate the dedicated, end-to-end network slice 240.

As shown at 250h, in a case where the network node 216 and/or the service handling platform 225 determines that the high priority application or service has been completed, an IRAT HO may be permitted. In some embodiments, permitting an IRAT HO to be performed (at 250h) may include determining whether there is an ongoing (e.g., data) communication/service (e.g., separate or different from the above-described high priority application or service) being facilitated for the UE 220. In a case where there is an ongoing data communication/service being facilitated for the UE 220, a second RAN cell may be selected (e.g., by the UE or by the network node 216), and IRAT mobility may be triggered to switch the UE 220 to establish a connection with the second RAN for continued service delivery. Here, for example, the RAN 210 may be selected, and the UE 220 may fall back to the RAN 210 (e.g., 5G NSA mode) to continue the ongoing data communication/service over the RAN 210 with the core network 230*a*. In certain embodiments, the UE 220 may be directed (e.g., at 250*i*) to return to the first RAN (e.g., 5G SA mode) after the ongoing data communication/service is completed.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2C depicts an illustrative embodiment of a data flow 275 in accordance with various aspects described herein. In certain embodiments, the data flow 275 may be similar to the method 250 of FIG. 2B.

At 275*a*, the UE 220 may (e.g., based upon cell searching or the like) select and "camp" on a cell associated with the network node 216 of a RAN 211 (e.g., in 5G SA mode). In various embodiments, the UE 220 may be configured to camp on a particular mode (e.g., 5G SA mode) by default.

At 275*b*, a high priority application or service, such as a voice/video IP call, may be initiated. For example, a user of the UE 220 may initiate a voice/video IP call or the UE 220 may receive an incoming voice/video IP call. Initiation of a voice/video IP call may, for example, involve a device modem or operating system triggering a UE route selection policy evaluation.

At 275*c*, a dedicated, end-to-end network slice may be assigned for the high priority application or service. For example, the network slice manager 236 may configure, or otherwise activate, an end-to-end network slice 240, having a particular network slice ID, for the high priority application or service between the UE 220 and the core network 230*b*.

At 275*d*, completion of the high priority application or service may be prioritized over any unneeded RAT switching. In exemplary embodiments, the high priority application or service may be permitted to continue, without RAT switching, until the high priority application or service is competed or unless one or more predefined criteria are satisfied (e.g., such as that described above with respect to reference number 250*e* of FIG. 2B). As depicted in FIG. 2C at 275*e*, for example, the network node 216 (or the service handling platform 225) may prevent execution of a non-essential IRAT HO associated with the network node 212 until the high priority application or service is completed and/or until the end-to-end network slice is released.

At 275*f*, upon completion of the high priority application or service, the RRC connection (between the UE 220 and the network node 216) may be released and a carrier frequency (or an IRAT carrier frequency) may be identified in a value redirectedCarrierInfo for redirecting the UE 220 to the network node 212 (e.g., for 5G NSA connectivity). In various embodiments, the network slice manager 236 may also release, or otherwise deactivate, the dedicated, end-to-end network slice. At 275*g*, the UE 220 and the network node 212 may establish an IRAT HO.

Figure 3:
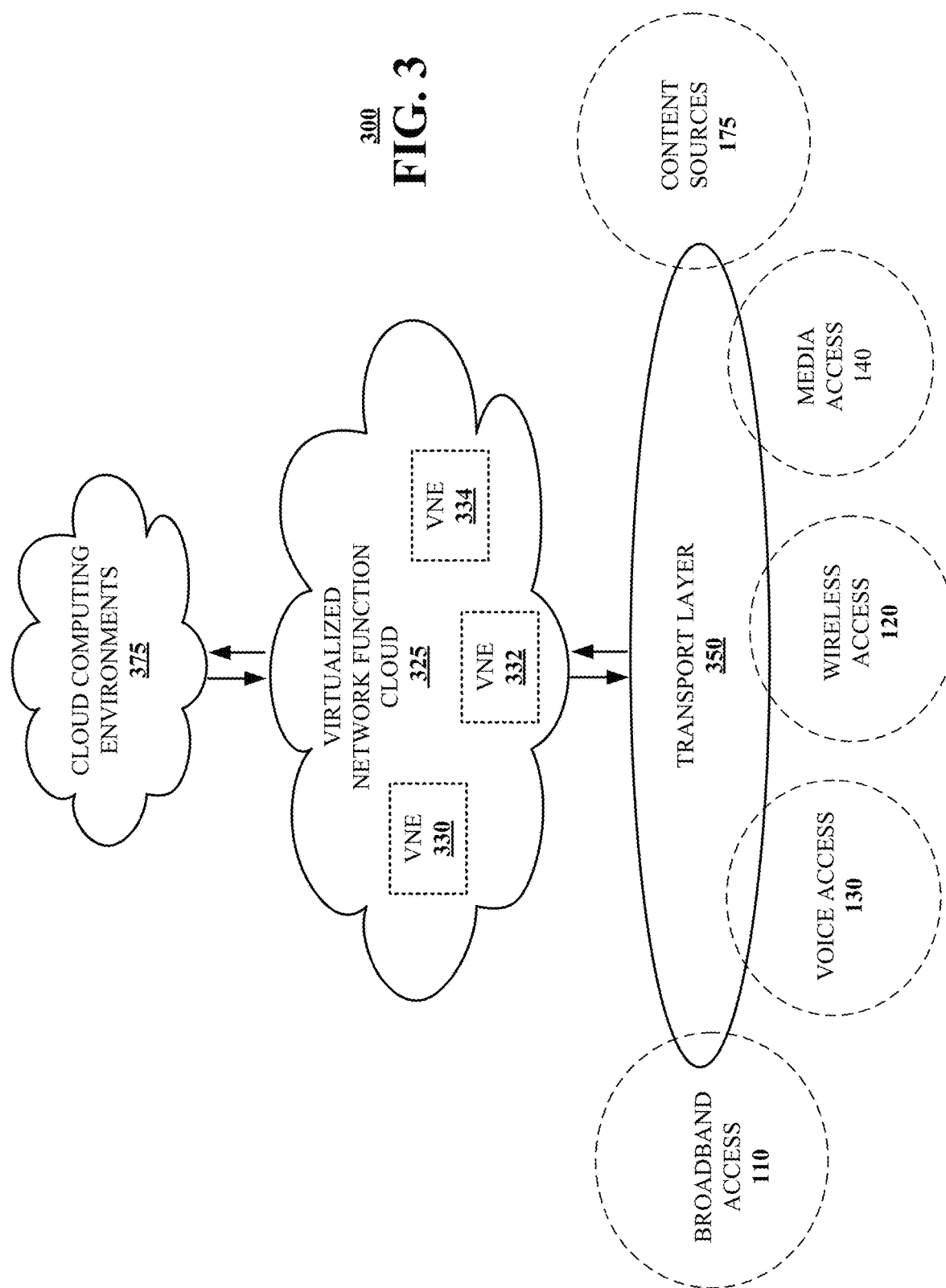
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, method 250, and data flow 275 presented in FIGS. 1 and 2A-2C. For example, virtualized communications network 300 can facilitate, in whole or in part, prioritizing of high priority, delay-sensitive (or interruption-sensitive) applications or services over RAT switching (or IRAT HOs).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
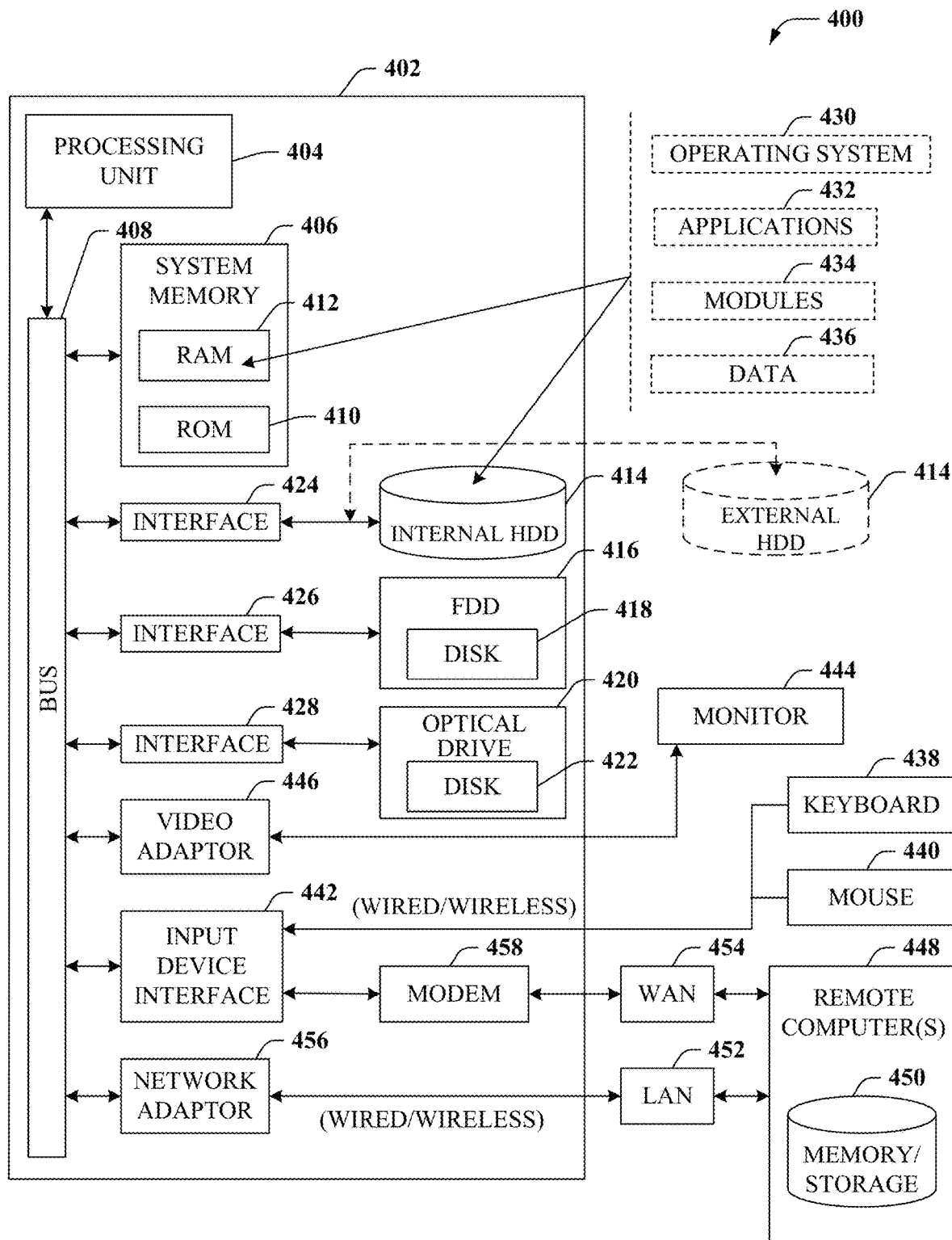
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, prioritizing of high priority, delay-sensitive (or interruption-sensitive) applications or services over RAT switching (or IRAT HOs).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
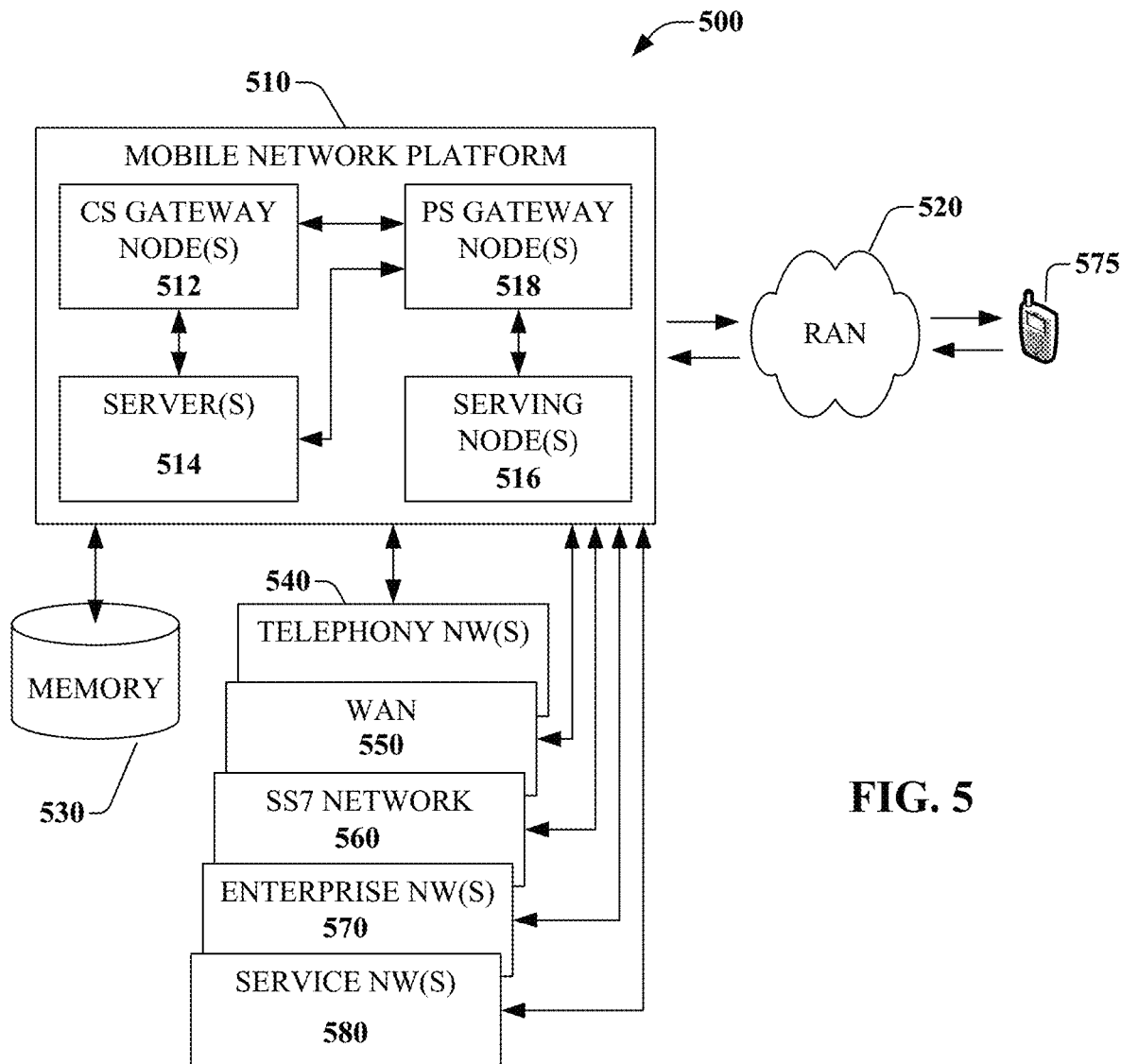
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, prioritizing of high priority, delay-sensitive (or interruption-sensitive) applications or services over RAT switching (or IRAT HOs). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
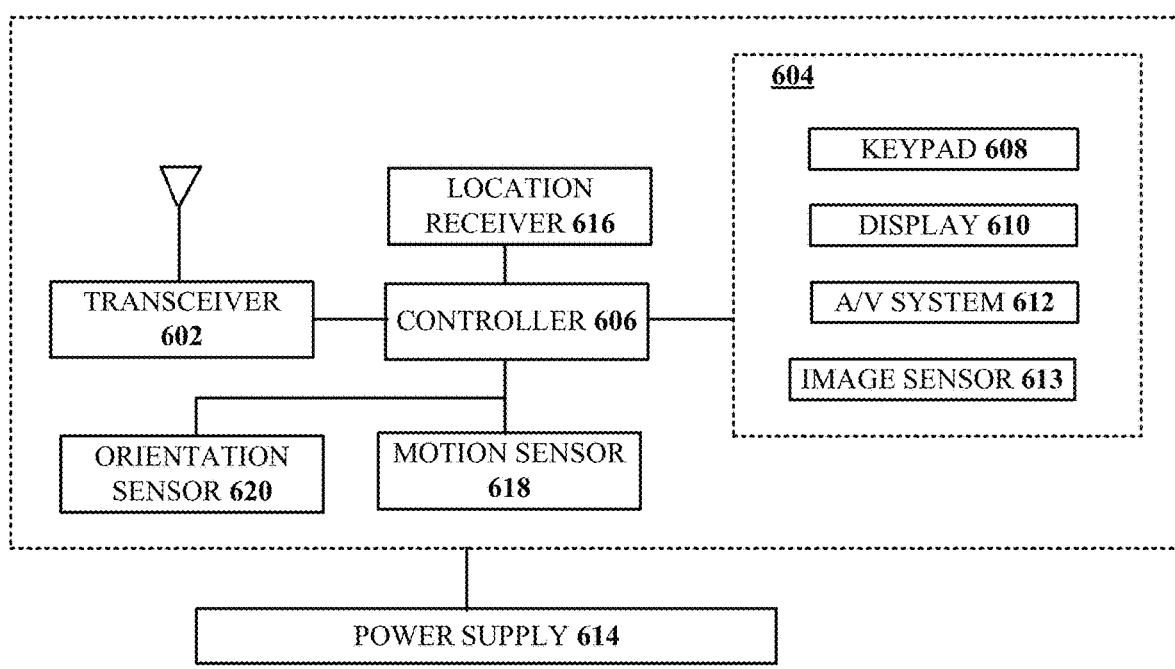
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, prioritizing of high priority, delay-sensitive (or interruption-sensitive) applications or services over RAT switching (or IRAT HOs).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600.

In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A first network node, comprising:
a processing system including a processor, wherein the first network node is associated with a first radio access technology (RAT); and
a memory that stores executable instructions that, when executed by the processing system, facilitate performance of operations, the operations comprising:
detecting initiation of a service associated with a user equipment (UE), wherein the service comprises an Over-the-Top (OTT) voice call or an OTT video call;
determining that a QoS parameter identifier is not associated with the service resulting in a first determination;
determining the service comprises a high priority application resulting in a second determination;
based on the first determination and the second determination, identifying an end-to-end network slice from a group of network slices according to the high priority application;
facilitating, for the service, activation of the end-to-end network slice between a core network and the UE for the first network node to facilitate the service;
detecting a RAT switch determination for the UE based on a first signal strength associated with the service is lower than a first threshold at a first time instance, wherein the RAT switch determination relates to communicative coupling of the UE with a second network node, and wherein the second network node is associated with a second RAT different from the first RAT;
responsive to the detecting the RAT switch determination, determining whether the service is ongoing over the end-to-end network slice resulting in a third determination;
determining that a second signal strength associated with the service is higher than a second threshold at a second time instance resulting in a fourth determination, wherein the second threshold is lower than the first threshold;
determining that a difference between the second time instance and the first time instance is less than a time period threshold resulting in a fifth determination; and
based on the third determination, the fourth determination, and the fifth determination, preventing the UE from communicatively coupling with the second network node until the service facilitated by the first network node is determined to be completed.

2. The first network node of claim 1, wherein the end-to-end network slice is associated with a network slice identifier (ID), and wherein the determining whether the service is ongoing over the end-to-end network slice comprises identifying whether there exists traffic, being facilitated by the first network node, that is associated with the network slice ID.

3. The first network node of claim 1, wherein the operations further comprise, permitting the UE to communicatively couple with the second network node responsive to the determining that the service facilitated by the first network node has been completed.

4. The first network node of claim 1, wherein the RAT switch determination is based on a change in signal strength associated with the service.

5. The first network node of claim 1, wherein the RAT switch determination is based on a throughput of the second network node being higher than a throughput of the first network node.

6. The first network node of claim 1, wherein the preventing the UE from communicatively coupling with the second network node comprises preventing the second network node from establishing an inter-RAT (IRAT) handover (HO) for the UE.

7. The first network node of claim 1, wherein the first network node operates in a 5G Standalone (SA) network configuration.

8. The first network node of claim 7, wherein the second network node operates in a 4G/Long Term Evolution (LTE) or 5G Non-Standalone (NSA) network configuration.

9. The first network node of claim 7, wherein the core network comprises a 5G Core (5GC) network.

10. The first network node of claim 7, wherein the UE is configured, by default, to camp to network nodes operating in the 5G SA network configuration.

11. A non-transitory machine-readable medium, comprising executable instructions that, when executed by a processing system of a first network node including a processor, facilitate performance of operations, the operations comprising:
detecting initiation of a service;
determining that a QoS parameter identifier is not associated with the service resulting in a first determination;
determining the service comprises a delay-sensitive application resulting in a second determination;
based on the first determination and the second determination, identifying a dedicated end-to-end network slice from a group of network slices according to the delay-sensitive application;

during facilitation of the delay-sensitive application or service by the first network node for a user equipment (UE) over the dedicated, end-to-end network slice, obtaining measurement data relating to the service, wherein the first network node relates to a first radio access technology (RAT);

determining, based on the measurement data, that a first signal strength associated with the delay-sensitive application or service is lower than a first threshold at first time instance resulting in a third determination;

determining, based on the measurement data, that a second signal strength associated with the delay-sensitive application or service is higher than a second threshold at a second time instance resulting in a fourth determination, wherein the second threshold is lower than the first threshold;

determining that a difference between the second time instance and the first time instance is less than a time period threshold resulting in a fifth determination;

responsive to the third determination, determining whether the delay-sensitive application or service is being facilitated for the UE over the dedicated, end-to-end network slice resulting in a sixth determination;

based upon the third determination, fourth determination, fifth determination, and the sixth determination, preventing a second network node, that is associated with a second RAT, from establishing an inter-RAT (IRAT) handover (HO) for the UE; and based upon a seventh determination that the delay-sensitive application or service is no longer being facilitated for the UE by the first network node over the dedicated, end-to-end network slice as a result of a completion of the delay-sensitive application or service, permitting the second network node to establish the IRAT HO for the UE.

12. The non-transitory machine-readable medium of claim 11, wherein the operations further comprise, based upon identifying that a third signal strength of the first network node is lower than the second threshold, permitting the second network node to establish the IRAT HO regardless of whether the delay-sensitive application or service is being facilitated for the UE over the dedicated, end-to-end network slice.

13. The non-transitory machine-readable medium of claim 11, wherein the obtaining the measurement data comprises obtaining at least a portion of the measurement data from the UE.

14. The non-transitory machine-readable medium of claim 11, wherein the delay-sensitive application or service comprises an Internet Protocol (IP)-based voice call or an IP-based video call.

15. The non-transitory machine-readable medium of claim 11, wherein the first network node is associated with a 5G Standalone (SA) network configuration, and wherein the second network node is associated with an Evolved Universal Terrestrial Radio Access (E-UTRA)-New Radio (NR) Dual Connectivity (EN-DC) network configuration.

16. A method, comprising:
detecting, by a processing system associated with a network slice manager and including a processor, an initiation of a service for a user equipment (UE), wherein the service comprises an OTT voice call or an OTT video call, wherein the UE is communicatively coupled to a first network node, and wherein the first network node relates to a first radio access technology (RAT);

determining that a QoS parameter identifier is not associated with the service resulting in a first determination;

determining the service comprises a high priority application resulting in a second determination;

based on the first determination and the second determination, identifying an end-to-end network slice from a group of network slices according to the high priority application; and configuring, by the processing system, the end-to-end network slice for the high priority application or service, wherein the end-to-end network slice facilitates delivery of the high priority application or service between a core network and the UE via the first network node, and wherein facilitation of the delivery of the high priority application or service over the end-to-end network slice enables the first network node to prioritize the high priority application or service over a RAT switch by preventing a second network node, that is associated with a second RAT, from performing the RAT switch based on the delivery of the high priority application or service is ongoing over the end-to-end network slice and that a first signal strength associated with the high priority application or service is lower than a first threshold at a first time instance and a second signal strength associated with the high priority application or service is higher than a second threshold at a second time instance until a completion of the delivery of the high priority application or service via the first network node, wherein the second threshold is lower than the first threshold, wherein a difference between the second time instance and the first time instance is less than a time period threshold.

17. The method of claim 16, wherein the end-to-end network slice is associated with a network slice identifier (ID), and wherein prioritizing the high priority application or service over the RAT switch by preventing the second network node from performing the RAT switch is based on a determination that traffic associated with the network slice ID is being delivered for the UE.

18. The method of claim 16, wherein the RAT switch is based on a decrease in signal strength associated with the high priority application or service or based on a throughput of the first network node being lower than a throughput of the second network node.

19. The method of claim 16, wherein the network slice manager is implemented in the core network.

20. The method of claim 19, wherein the core network comprises a 5G Core (5GC) network.

* * * * *